April 29, 1941.    I. HUNTER ET AL    2,239,917
ADJUSTABLE VEHICLE SEAT SUPPORT
Filed June 22, 1939    2 Sheets-Sheet 1
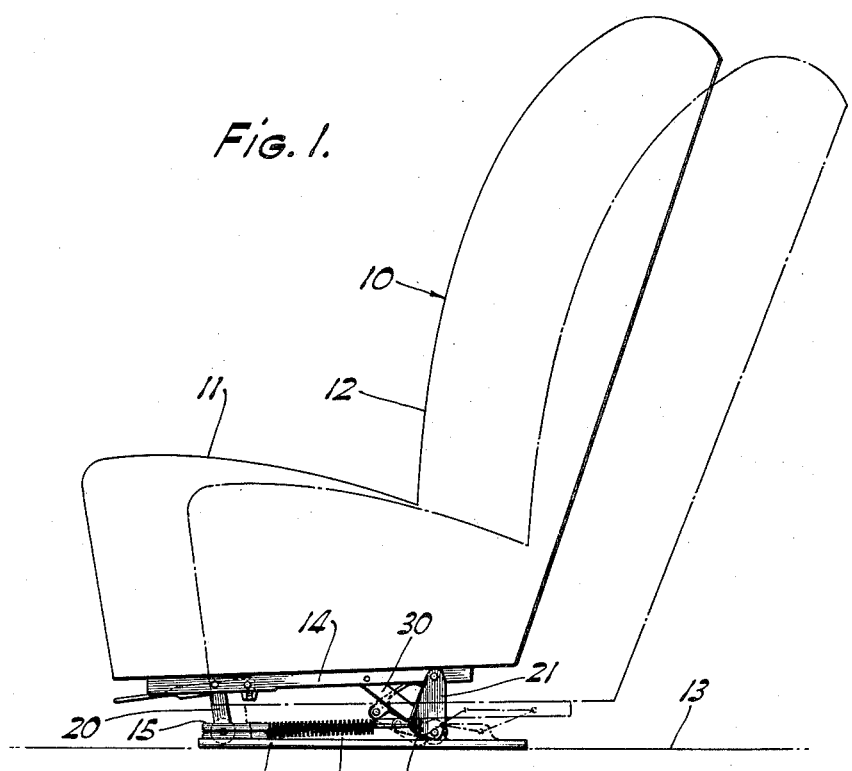
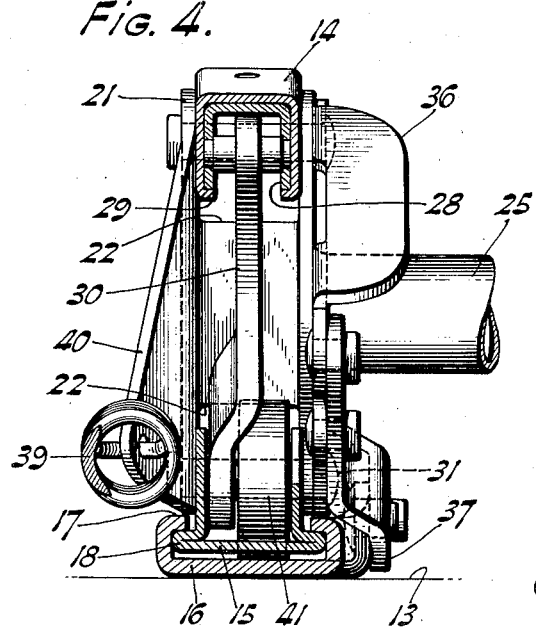
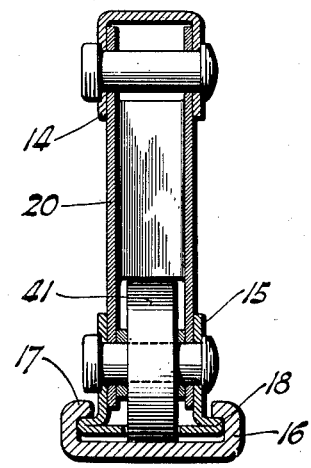
INVENTORS
IRVING HUNTER AND
ARTHUR B. SHORT
BY
Beau, Brooks, Buckley & Beau.
ATTORNEYS April 29, 1941.　　　I. HUNTER ET AL　　　2,239,917
ADJUSTABLE VEHICLE SEAT SUPPORT
Filed June 22, 1939　　2 Sheets-Sheet 2
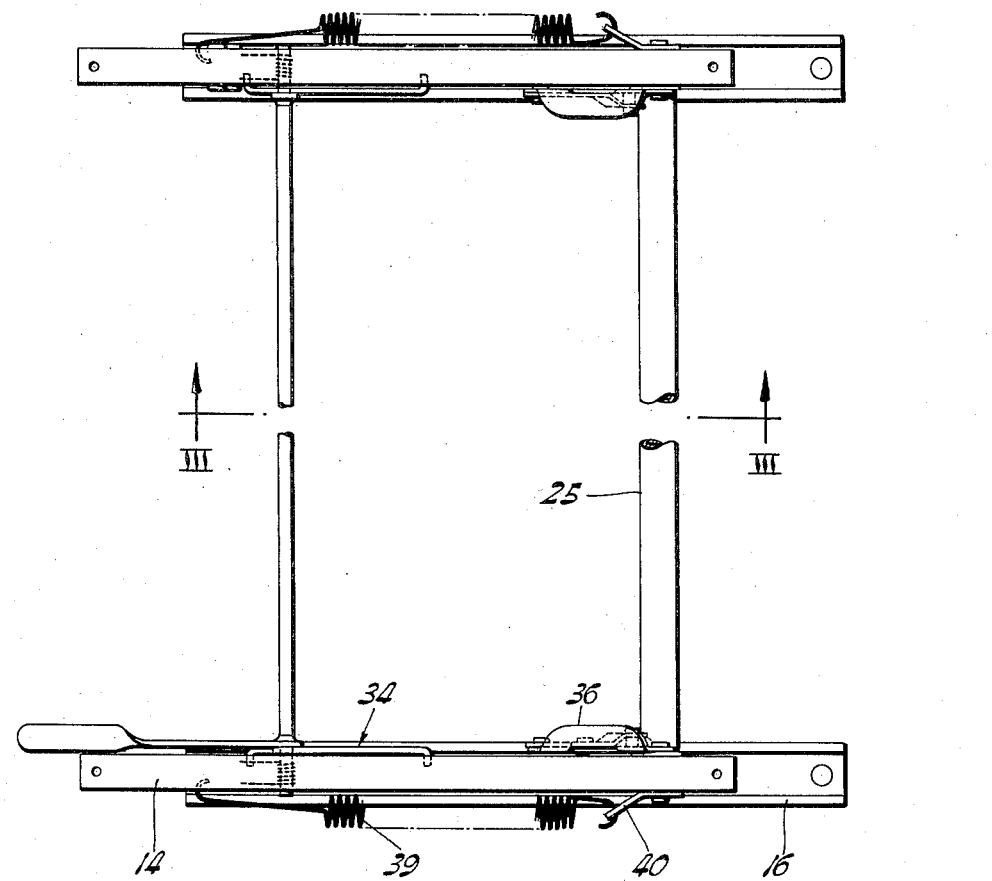
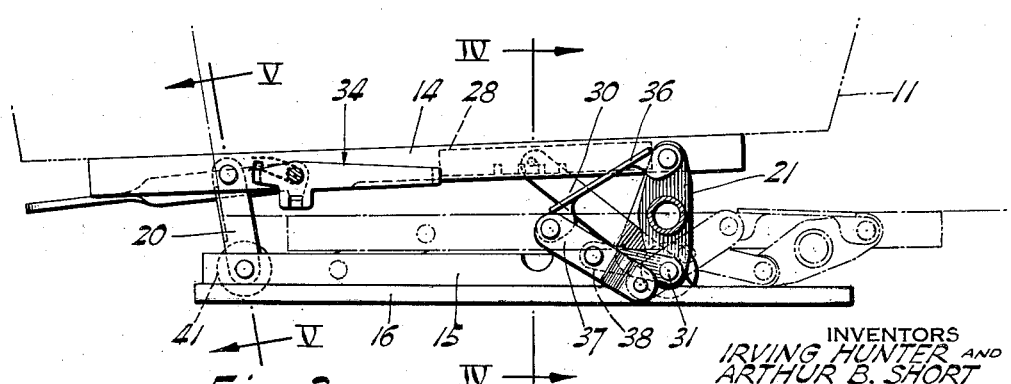
INVENTORS
IRVING HUNTER AND
ARTHUR B. SHORT
BY
Beau, Brooks, Buckley & Beau.
ATTORNEYS Patented Apr. 29, 1941

2,239,917

UNITED STATES PATENT OFFICE 2,239,917

ADJUSTABLE VEHICLE SEAT SUPPORT

Irving Hunter and Arthur B. Short, Medina, N. Y., assignors, by direct and mesne assignments, of seventy-five per cent to Le Grand S. Whedon, Medina, N. Y., and twenty-five per cent to Barton A. Bean, Jr., Buffalo, N. Y.

Application June 22, 1939, Serial No. 280,616

8 Claims. (Cl. 155—14)

This invention relates to seating fixtures for vehicles and particularly to such fixtures as provide means for adjustment of the position of the seat of the operator of a vehicle.

The present invention aims to provide an improved seat adjusting fixture which may be installed in a vehicle as a unit and which supports a seat proper in such manner that it may be releasably locked in a selected position or moved therefrom along a predetermined path to a different position of adjustment. The invention further provides means whereby adjusting movements of the seat are controlled in such manner that each horizontally adjusted position of the seat has an integrated and related vertical position corresponding thereto. Further, the seat is supported in such manner, by the fixture of the present invention, that its bodily inclination, considered in a plane taken longitudinally of the vehicle, is varied with variations in the adjusted position of the seat so that each adjusted position of the seat has a predetermined adjusted inclination of the seat.

A further important consideration in the present invention is the provision of means for accomplishing the stated purposes which means may, without sacrificing strength or structural rigidity, be encompassed within a minimum of space, particularly with respect to vertical dimension. Present day vehicular design is such that only a slight distance is available between the bottom of the seat body and the surface of the floor of the vehicle for the interposition of means for adjustably supporting the seat body. The present invention fully meets the requirements of compactness without sacrificing anything in the way of smoothness and ease of operation, accessibility for adjustment, and structural rigidity.

While a single specific embodiment of the invention is illustrated in the drawings and described in the ensuing specification it is to be understood that this is for the purpose of exemplification and our invention is not to be considered as limited thereby or in any other way save as defined in the appended claims.

In the drawings:

Fig. 1 is a side elevational view of a seat installation of a vehicle in which the supporting and adjusting fixture of the present invention has been incorporated;

Fig. 2 is a plan view of the fixture itself with the central portions of the transverse rods broken away to permit illustration on a larger scale;

Fig. 3 is a cross sectional view taken on the line III—III of Fig. 2;

Fig. 4 is a cross sectional view taken on the line IV—IV of Fig. 3 but shown substantially full size; and, Fig. 5 is a fragmentary cross sectional view taken on the line V—V of Fig. 3.

Throughout the several figures of the drawings like characters of reference denote like parts and the numeral 10 designates generally a conventional seat body having a seat portion 11 and a back 12. The upper surface of the floor of the vehicle is indicated at 13. The supporting and adjusting fixture proper comprises pairs of vertically aligned and longitudinally extending upper and lower channel members 14 and 15 respectively. Two such pairs of channels 14, 15 are normally provided for supporting the seat 10 at its opposite sides and in the preferred construction the upper channel members 14 are adapted to be secured directly to the bottom of seat 10 by means of screws or the like.

The lower channel members 15 are arranged within or upon base strips 16 and are so associated with the base strips 16 that they may move longitudinally therein or thereupon. In the illustrated form the base strip 16 comprises an upwardly facing channel having inwardly directed flanges 17 at its upper edges. The lower channel members 15 are formed with return bend portions which form outwardly directed flanges 18 at the juncture of the webs and the flanges of the channels and the flanges 18 are adapted to engage under the flanges 17 of the base strips 16 in such manner that the longitudinal movements of the lower channel members 15 with respect to the base strips 16 are positively guided and the former elements are retained within the latter against upward movement.

Each upper channel member 14 is associated for movement with respect to its related lower channel member 15 by forward and rearward links 20 and 21 respectively, each link 20 and 21 having its ends pivotally connected to the upper and lower channel members 14 and 15. The forward links 20 are of channel cross section and the opposed flanges are so spaced as to fit within the flanges of the channel members 14 and 15 as appears in Fig. 5.

The rear links 21 are likewise of channel cross section but the flanges of the rear links are arranged to fit outside of the flanges of the channels 14 and 15 as appears in Fig. 4. To provide clearance for the channels 14 and 15 the web portions of the channel shaped links 21 are cut away at their opposite ends as at 22. It will be noted that the rear links 21 are of greater length than the front links 20.

The spacing of the connections of the links 20 and 21 with each pair of channels 14 and 15 is such that when the upper channel member 14 is swung to its lowered position, indicated in dot and dash lines in Fig. 3, it extends substantially parallel to and closely adjacent the lower channel member 15. When the channels 14 are moved upwardly, however, by pivotal movement of the links 20 and 21, the rear portions thereof move upwardly at a greater rate than the front portions due to the greater length of the rear links 21. In this way the seat is given a forward tilting movement as it is elevated and brought forward and is thereby placed in a more efficient position for persons of shorter stature. It will be noted that in its forward or upright position each front link 20 will have been moved slightly beyond its vertical position, while each rear link 21, in movement to its forward position, reaches approximately a vertical position.

In the form of the invention illustrated in the drawings a transverse connecting member 25 extends between the pair of rear links 21 and is firmly secured to each of them as by welding or the like.

Suitable means are provided for securing the upper track members 14 and their supporting links in a variety of adjusted positions and such means include a channel member 28 which fits within each of the upper channels 14 and is adapted to slide therealong. The upper channels 14 are provided with inturned flanges 29 at their lower edges for retaining the channel members 28. A link 30 is pivotally connected at its opposite ends to each channel member 28 and to the pivot pin 31 which serves also to pivotally connect the rear link 21 to its associated lower channel member 15.

It will appear from the structure so far described that movement of the upper channel members 15 from their full line raised positions of Fig. 3 to their dotted line lowered positions of that figure, by swinging movement of the links 20 and 21 about their lower pivotal connections with the lower channel members 15, will result in differential movement of the channel members 28 within the upper channel members 14 and a consequent sliding of the former within the latter.

By providing means for locking the channel members 28 to the channel members 14 against such longitudinal movement, in various adjusted positions, swinging movement of the links 20 and 21 and the upper channel members 14 is effectively prevented. The latch means for effecting such locking, and designated generally 34, is illustrated and described in detail in our co-pending application Serial No. 249,880 filed January 9, 1939, and such description need therefore not be repeated here.

It has been noted that the lower channel members 15 are arranged for relative sliding movement with respect to base strips 16 and it is contemplated that such sliding movement shall be under the control of and have a direct relation to the swinging movement of the upper channel members 14 on the links 20 and 21. To effect such inter-relation a toggle linkage 36, 37 has its outer ends pivotally connected to the upper pivot of each rear link 21 and to each base strip 16. Each toggle 36, 37 is provided with a control link 38 which connects pivotally with the lower toggle link 37 medially of its length and the opposite end of which is pivotally secured by the pivot pin 31 for the lower end of each rear link 21.

By virtue of this mechanism for controlling the sliding of the lower channel members 15 with respect to the base strips 16, each increment of swinging movement of the upper channel members, say from a raised to a lowered position, is accompanied by an increment of rearward sliding movement of the lower channel members 15, and of course of the links 20 and 21 and the upper channel members 14 carried thereby, upon the base strips 16. With this construction the actual path of movement of the seat 19 as defined by the swinging of the links and the complemental movement of the entire fixture upon the base strips 16, is in a longer and flatter curvilinear path than would otherwise be attainable.

To permit the device to assume a completely lowered and compact condition the upper toggle link 36 is offset as shown in Figs. 3 and 4 to provide clearance for the brace rod 25. Suitably proportioned counterbalancing coil springs 39 are connected at their opposite ends to the forward ends of the lower channel members 15 and to extensions 40 formed upon the rear links 21. The location of the connection of each of the springs 39 to its associated rear link 21 is such that lowering and raising movements of the fixture result respectively in extension and contraction of the springs 39.

In the illustrated embodiment freely rotatable rollers 41 are arranged upon each of the lower pivot pins for the front and rear links 20 and 21 and suitable openings are provided in the webs of the lower channel members 15 to permit the rollers 41 to engage upon and roll along the base strips 16 during longitudinal movements of the lower channel members 15 with respect to the base strips 16. The web portions of the channel shaped links 20 and 21 are suitably cut away to provide space for the rollers 41. It is obvious that the rollers 41 may be omitted in which case the lower channel members 15 will slide directly upon the base strips 16.

Suitable modifications, apparent to those skilled in the art, may be made in the seat adjusting and supporting fixture herein disclosed without departing from the spirit and scope of our invention.

We claim:

1. In a vehicle seat adjusting and supporting structure, means engageable with a vehicle seat, other means engageable with the body of a vehicle, a pair of front parallel links pivotally engaging at their opposite ends said seat engaging means and said body engaging means, a pair of rear parallel links pivotally engaging at their opposite ends said seat engaging means and said body engaging means, whereby the links are movable about their pivotal engagement with said body engaging means to carry said seat engaging means between upper forward and lower rearward positions, said body engaging means comprising an element adapted to be rigidly associated with a vehicle body and an element movable horizontally with respect thereto, and actuating mechanism engaging between said rigid element and said movable element and responsive to pivotal movement of said links to effect controlled relative forward and rearward movement of said elements, said actuating mechanism comprising toggle linkage between said seat engaging means and said rigid element and a link pivotally connected to said toggle linkage and the movable element.

2. In a vehicle seat adjusting and supporting structure, means engageable with a vehicle seat, other means engageable with the body of a vehicle, a pair of front parallel links pivotally engaging at their opposite ends said seat engaging means and said body engaging means, a pair of rear parallel links pivotally engaging at their opposite ends said seat engaging means and said body engaging means, whereby the links are movable about their pivotal engagement with said body engaging means to carry said seat engaging means between upper forward and lower rearward positions, said body engaging means comprising an element adapted to be rigidly associated with a vehicle body and an element movable horizontally with respect thereto, actuating mechanism engaging between said rigid element and said movable element and responsive to pivotal movement of said links to effect controlled relative forward and rearward movement of said elements upon pivotal movement of said links, said actuating mechanism comprising toggle linkage between said seat engaging means and said rigid element and a link pivotally connected to said toggle linkage and the movable element, and means for securing said structure in adjusted position, said means comprising an element slidable with respect to said seat engaging means and a link engaging between said slidable element and the body engaging means whereby relative movement between the body engaging means and the seat engaging means effects sliding movement between said body engaging means and said slidable element, and releasable means acting between said seat engaging means and said slidable element for selectively preventing relative sliding movement therebetween.

3. In a vehicle seat adjusting and supporting structure, means engageable with a vehicle seat, other means engageable with the body of a vehicle, said body engaging means comprising an element adapted to be rigidly associated with a vehicle body and an element movable horizontally with respect thereto, means engaging between said movable element and said seat engaging means for defining relative movement therebetween in a curvilinear path, and actuating mechanism engaging between said rigid element and said movable element and responsive to relative curvilinear movement between said seat engaging means and said movable element to effect controlled relative forward and rearward movement of said movable element with respect to said rigid element, said actuating mechanism comprising toggle linkage between said seat engaging means and said rigid element and a link pivotally connected to said toggle linkage and said movable element.

4. In a vehicle seat adjusting and supporting structure, means engageable with a vehicle seat, other means engageable with the body of a vehicle, said body engaging means comprising an element adapted to be rigidly associated with a vehicle body and an element movable horizontally with respect thereto, means engaging between said movable element and said seat engaging means for defining relative movement therebetween in a curvilinear path, mechanism engaging between said rigid element and said movable element and responsive to relative curvilinear movement between said seat engaging means and said movable element to effect controlled relative forward and rearward movement of said movable element with respect to said rigid element, said mechanism comprising toggle linkage between said seat engaging means and said rigid element and a link pivotally connected to said toggle linkage and said movable element, and means for securing said structure in adjusted position, said means comprising an element slidable with respect to said seat engaging means and a link engaging between said slidable element and the body engaging means whereby relative movement between the body engaging means and the seat engaging means effects sliding movement between said body engaging means and said sliding element, and releasable means acting between said seat engaging means and said slidable element for selectively preventing relative sliding movement therebetween.

5. In a vehicle seat adjusting and supporting structure, means engageable with a vehicle seat, other means engageable with the body of a vehicle, a pair of front parallel links pivotally engaging at their opposite ends said seat engaging means and said body engaging means, a pair of rear parallel links pivotally engaging at their opposite ends with said seat engaging means and said body engaging means, whereby the links are movable about their pivotal engagement with said body engaging means to carry said seat engaging means between upper forward and lower rearward positions, said body engaging means comprising elements associated for relative horizontal movement for providing forward and rearward movement of said seat engaging means and its associated linkage with respect to the vehicle body, and actuating mechanism engaging between said last mentioned elements and responsive to pivotal movement of said links to effect controlled relative forward and rearward bodily movement of the linkage assembly upon pivotal movement of said links, said actuating mechanism comprising toggle linkage between said seat engaging means and a point stationary with respect to the vehicle and link pivotally connected to said toggle linkage and the movable element of said relatively horizontally movable elements.

6. In a vehicle seat adjusting and supporting structure, means engageable with a vehicle seat, other means engageable with the body of a vehicle, a pair of members movable forward and rearward with respect to said body engaging means, a pair of front parallel links pivotally engaging at their opposite ends with said seat engaging means and said movable members, a pair of rear parallel links pivotally engaging at their opposite ends said seat engaging means and said movable members, whereby the links are movable about their pivotal engagement with said movable members to carry said seat engaging means between upper forward and lower rearward positions, rollers associated with the pivotal connection between said parallel links and said movable members for rolling engagement with said body engaging means, and actuating mechanism engaging between said body engaging means and said movable members to effect controlled relative forward and rearward movement of said movable members upon pivotal movement of said links.

7. In a vehicle seat adjusting and supporting structure, means engageable with a vehicle seat, other means engageable with the body of a vehicle, a pair of members movable forward and rearward with respect to one of said means, a pair of front parallel links pivotally engaging at their opposite ends with the other of said means and said movable members, a pair of rear parallel links also pivotally engaging at their opposite ends said other means and said movable members, whereby the links may pivot to carry said seat engaging means between upper forward and lower rearward positions, rollers associated with the pivotal connection between said parallel links and said movable members for rolling engagement with the one of said means, and actuating mechanism engaging between the one of said means and said movable members and responsive to pivotal movement of said links to effect controlled relative forward and rearward movement between the movable members and the one of said means, said actuating mechanism comprising toggle linkage between said seat engaging means and said body engaging means and a link pivotally connected to said toggle linkage and one of the movable members.

8. In a vehicle seat adjusting and supporting structure, means engageable with a vehicle seat, other means engageable with the body of a vehicle, a pair of members movable forward and rearward with respect to said body engaging means, a pair of front parallel links pivotally engaging at their opposite ends with said seat engaging means and said movable members, a pair of rear parallel links pivotally engaging at their opposite ends said seat engaging means and said movable members, whereby the links are movable about their pivotal engagement with said movable members to carry said seat engaging means between upper forward and lower rearward positions, rollers associated with the pivotal connection between said parallel links and said movable members for rolling engagement with said body engaging means, and actuating mechanism engaging between said body engaging means and said movable members to effect controlled relative forward and rearward movement of said movable members upon pivotal movement of said links, said mechanism comprising toggle linkage between said seat engaging means and said body engaging means and a link pivotally connected to said toggle linkage and one of the movable members.

IRVING HUNTER.
ARTHUR B. SHORT.